United States Patent
Blanchard et al.

(10) Patent No.: US 11,370,260 B2
(45) Date of Patent: Jun. 28, 2022

(54) SUSPENSION THRUST BEARING DEVICE AND SUSPENSION STRUT EQUIPPED WITH SUCH A DEVICE

(71) Applicant: Aktiebolaget SKF, Gothenburg (SE)

(72) Inventors: Xavier Blanchard, Saint-Cyr-sur-Loire (FR); Guillaume Jouanno, Tours (FR); Bruno Montboeuf, Saint-Cyr-sur-Loire (FR); Desire Vidot, Ballan-Miré (FR)

(73) Assignee: SKF Aerospace France S.A.S

( * ) Notice: Subject to any disclaimer, the term of this patent is extended or adjusted under 35 U.S.C. 154(b) by 56 days.

(21) Appl. No.: 16/839,456

(22) Filed: Apr. 3, 2020

(65) Prior Publication Data

US 2020/0384820 A1    Dec. 10, 2020

(30) Foreign Application Priority Data

Jun. 5, 2019   (DE) .......................... 102019208170.3

(51) Int. Cl.
*B60G 13/16*  (2006.01)
*B60G 15/02*  (2006.01)
(Continued)

(52) U.S. Cl.
CPC ............. *B60G 15/04* (2013.01); *B60G 13/16* (2013.01); *B29L 2031/3002* (2013.01);
(Continued)

(58) Field of Classification Search
CPC ........ B60G 15/02; B60G 15/04; B60G 13/16; B60G 2206/7104; B60G 2206/71043; B60G 2204/1242; B60G 2204/12422; B60G 2204/418; B60G 2204/128; B60G 15/068; B60G 2206/81012;
(Continued)

(56) References Cited

U.S. PATENT DOCUMENTS 5,133,573 A * 7/1992 Kijima ................ B60G 15/068
267/220
2010/0014792 A1   1/2010 Kellam
(Continued)

FOREIGN PATENT DOCUMENTS

EP    0215231 B1   2/1990
EP    2152531 B1   7/2011

OTHER PUBLICATIONS

Description Translation for (EP 2,152,531) from Espacenet (Year: 2011).*

*Primary Examiner* — James A English
*Assistant Examiner* — Daniel M. Keck
(74) *Attorney, Agent, or Firm* — Garcia-Zamor Intellectual Property Law; Ruy Garcia-Zamor; Bryan Peckjian

(57) ABSTRACT

A suspension thrust bearing device for use with a suspension spring in an automotive suspension strut of a vehicle. The device provides a bearing having upper and lower annular bearing members in relative rotation, lower bearing member having a lower cup having at least one protruding indexation element. The device also provides a damping element made of resilient material and interposed between the lower cup and the suspension spring. The indexation element is made of a different material than that of the lower cup, the lower cup being made of a rigid plastic material and the indexation element being made of a resilient material.

10 Claims, 4 Drawing Sheets

(51) Int. Cl.
  *B60G 15/04* (2006.01)
  *B60G 15/06* (2006.01)
  *B29C 31/00* (2006.01)
  *F16C 19/16* (2006.01)
  *B29L 31/30* (2006.01)

(52) U.S. Cl.
  CPC ............... *B60G 2204/128* (2013.01); *B60G 2204/12422* (2013.01); *B60G 2204/418* (2013.01); *B60G 2206/7104* (2013.01)

(58) Field of Classification Search
  CPC .. B60G 2202/31; F16C 19/16; F16C 2326/05; B29C 31/008; B29L 2031/3002
  See application file for complete search history.

(56) References Cited

U.S. PATENT DOCUMENTS

| | | | |
|---|---|---|---|
| 2020/0238779 A1 | 7/2020 | Blanchard et al. | |
| 2020/0240465 A1 | 7/2020 | Blanchard et al. | |
| 2020/0406515 A1* | 12/2020 | Lim | F16C 19/10 |

* cited by examiner

SUSPENSION THRUST BEARING DEVICE AND SUSPENSION STRUT EQUIPPED WITH SUCH A DEVICE

CROSS-REFERENCE TO RELATED APPLICATIONS

This application claims priority to German Patent Application no. 102019208170.3, filed Jun. 5, 2019, the contents of which is fully incorporated herein by reference.

TECHNICAL FIELD OF THE INVENTION

The present invention relates to a suspension thrust bearing device, in particular of the MacPherson type ("MacPherson Suspension Bearing Unit" or MSBU). The invention also relates to a strut for a motor vehicle, comprising a damper and such a suspension thrust bearing device. The field of the invention is that of suspension systems, notably motor-vehicle suspension systems.

BACKGROUND OF THE INVENTION

In a known manner, a motor vehicle suspension system comprises a suspension strut supporting an axle and a vehicle wheel. A suspension thrust bearing device is disposed in an upper portion of the suspension strut, opposite to the wheel and the ground, and between a suspension spring and an upper support block attached to the vehicle chassis.

The suspension thrust bearing device includes at least one bearing, for example a rolling bearing, comprising upper and lower annular bearing members in relative rotation around a main axis.

The suspension thrust bearing device enables transmission of axial forces between the spring and the body of the vehicle and, in the meantime, allows relative angular movement between the spring, which is mobile in rotation, and the fixed support block attached to the body.

The damping function of the suspension thrust bearing device can be improved using a damping element made of resilient material and mounted between the lower annular bearing member and the suspension spring. In a known manner, the damping element is overmolded onto the lower member.

In a known manner, the suspension thrust bearing device may also comprise at least one indexation element. A suspension thrust bearing device generally comprises a first indexation element that extends radially outwardly from the lower annular bearing member, and a second indexation element that also extends radially outwardly from the upper annular bearing member. When mounting the device, the two radial indexation elements are adjusted respectively one to the other. Such radial indexation elements permit to define the assembly direction of the two associated annular members, and with respect to the vehicle chassis and the wheel.

It is also known to provide at least on axial indexation element that downwardly axially protrudes from lower side of lower annular member. Such an axial indexation element permits to ensure a correct assembly of a dust boot onto the lower side of lower annular member, and to form a rotation prevention portion.

The axial and radial indexation elements are manufactured directly with a rigid plastic cup. However, such rigid axial and radial indexation elements protrude axially and radially outwards from the suspension thrust device. They may be subject to shocks during their assembly process or their transportation. Then the elements may be broken and the device is not validated for use on a vehicle.

SUMMARY OF THE INVENTION

The aim of the invention is to overcome these drawbacks by proposing an enhanced suspension thrust bearing device. It is desirable to provide a suspension thrust bearing device which is relatively inexpensive, has a good operational reliability, and has an increased service life.

To this end, the invention relates to a suspension thrust bearing device, for use with a suspension spring in an automotive suspension strut of a vehicle. The suspension thrust bearing device comprises a bearing having upper and lower annular bearing members in relative rotation. Lower bearing member comprises a lower cup provided with at least one protruding indexation element.

The suspension thrust bearing device further comprises a damping element made of resilient material and interposed between the lower cup and the suspension spring.

According to the invention, the indexation element is made of a different material than that of the lower cup, the lower cup being made of a rigid plastic material and the indexation element being made of a resilient material.

According to further aspects of the invention which are advantageous but not compulsory, such a suspension thrust bearing device may incorporate one or several of the following features:

The suspension thrust bearing device comprises a bearing with a first ring fixed to an upper cup, so as to form the upper annular bearing member of the suspension thrust bearing, and a second ring fixed to the lower cup, so as to form the lower annular bearing member of the suspension thrust bearing.

The first and second rings are made from a stamped metal sheet.

The upper cup is made of a rigid plastic material.

The at least one indexation element is formed integral with the damping element.

The lower cup is provided with an axial hub.

The damping element is provided with an axial portion fixed to an outer surface of axial hub of lower cup.

At least one indexation element axially downwardly protrudes from lower side of the axial hub of lower cup.

At least one indexation element axially downwardly protrudes from lower side of the axial portion of damping element.

The lower cup comprises an outwardly radially-extending flange.

The damping element is provided with a radial portion fixed to a lower surface of flange of lower cup.

At least one indexation element radially outwardly protrudes from outer side of the flange of lower cup.

At least one indexation element radially outwardly protrudes from outer side of the radial portion of damping element.

The device comprises at least one sealing element attached to one of the lower and upper cups.

At least one indexation element is formed integral with a sealing element.

At least one indexation element radially outwardly protrudes from an outer sealing element.

At least one indexation element axially downwardly protrudes from an inner sealing element.

The bearing is a rolling bearing, the first and second rings defining an annular rolling chamber between them and at least one row of rolling elements being disposed within the rolling chamber.

The rolling elements are balls.

The indexation element is directly molded on the lower cup.

The indexation element comprises rubber thermoplastic elastomer (TPE), in particular thermoplastic polyurethane (TPU), melt processable elastomer (MPE) or elastomer cellular foam.

The lower cup is made of polyamide.

The invention also relates to a motor vehicle suspension strut comprising a damper rod, a suspension spring, and a suspension thrust bearing device as mentioned above.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

Figure 1:
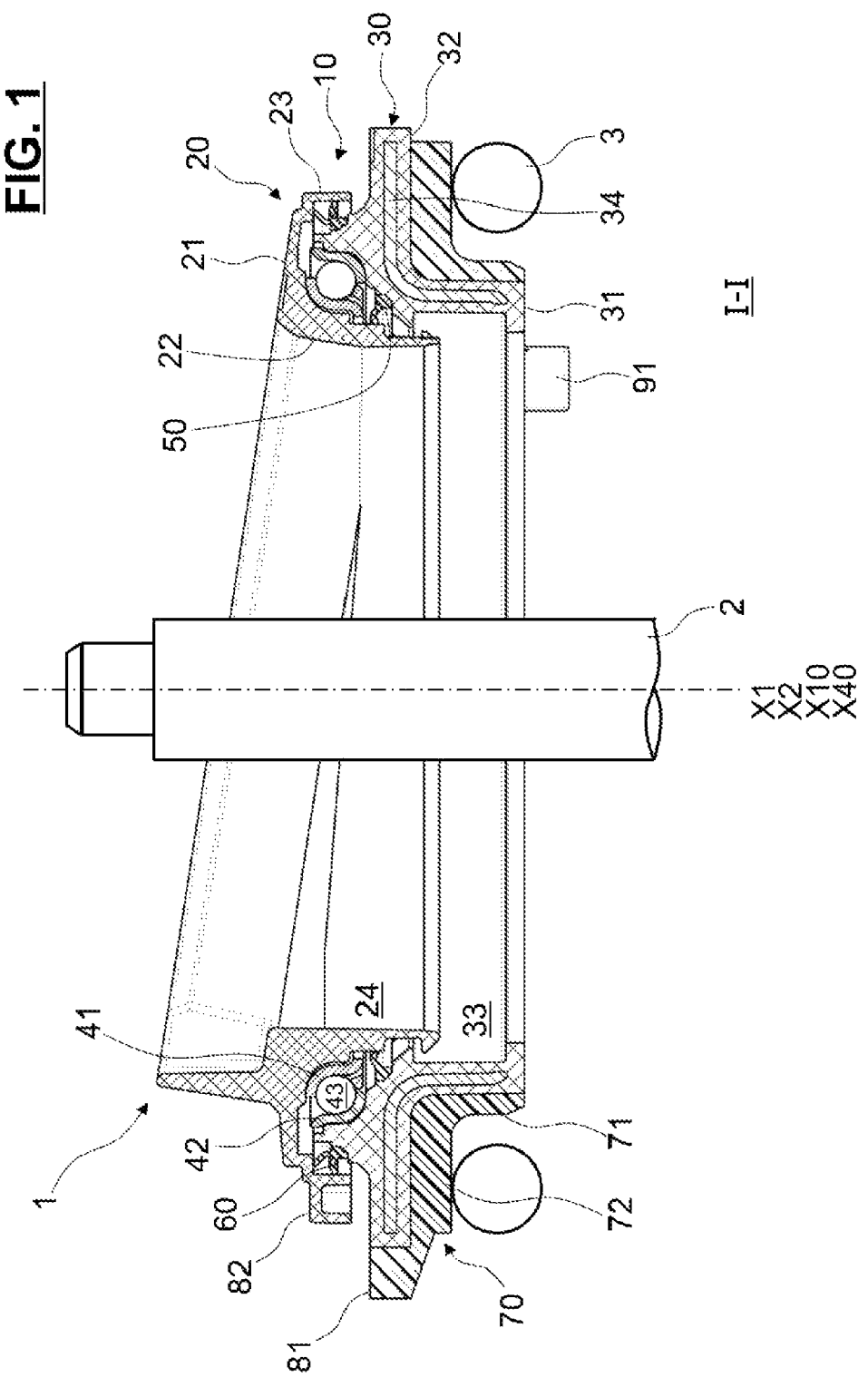
FIG. 1 is a sectional view along line I-I of a suspension strut according to a first embodiment of the invention, comprising a suspension thrust bearing unit also according to a first embodiment of the invention, and a damper rod and a suspension spring.
Figure 2:
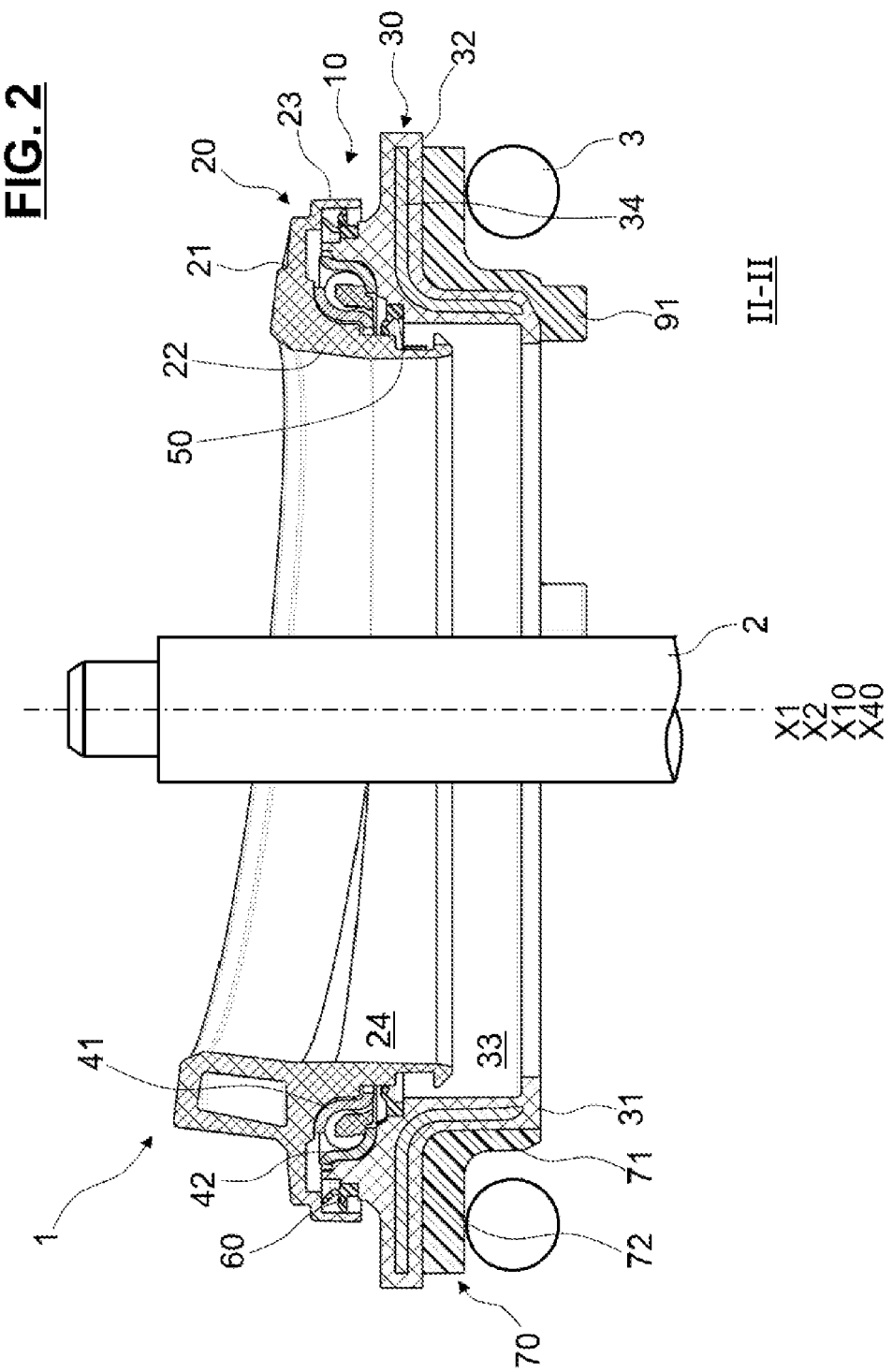
FIG. 2 is a sectional view along line II-II of the suspension strut of FIG. 1.

A suspension strut 1, partially shown in FIG. 1, is incorporated into a motor-vehicle suspension system. The suspension strut 1 supports a vehicle axle and wheel which are not shown for the purposes of simplification. The suspension strut 1 extends along a main axis X1, placed in substantially vertical direction when the wheel of the vehicle rests on flat ground. The suspension strut 1 comprises a damper piston including a piston body and a damper rod 2 of axis X2, a coil suspension spring 3 and a suspension thrust bearing device 10. The rod 2 and the spring 3 are partially shown in FIG. 1, while the piston body is not shown for the purposes of simplification.

The suspension thrust bearing device 10 with main axis X10 is mounted between the spring 3 and a support block (not shown) connected to the chassis of a motor vehicle. The axis X2 and X10 coincide with the main axis X1 when the suspension system of the vehicle is at rest, as illustrated in FIG. 1.

Hereinafter, the adjectives "axial" and "radial" are defined relative to the main axis X10 of the annular thrust bearing device 10.

The suspension thrust bearing device 10 comprises an upper cup 20, a lower cup 30 and a single rolling bearing 40. In this embodiment, these three components 20, 30 and 40 are of globally circular shape about a main axis X40 coinciding with the main axis X10 when the suspension system of the vehicle is at rest.

The upper cup 20 consists in a one-piece part made from plastic synthetic material, for example from polyamide, optionally reinforced with glass fibers. The upper cup 20 has a radially-extending flange 21, an inner axially-extending hub 22 of relatively small diameter and extending towards the lower side of the suspension thrust bearing device 10, and an outer axially-extending skirt 23 of relatively large diameter and extending towards the lower side of the suspension thrust bearing device 10. The inner hub 22 defines an inner bore 24 for the suspension thrust bearing device 10 wherein the damper rod 2 is mounted.

The upper cup 20 is dedicated to be fixed to a support block of the automotive vehicle chassis.

The rolling bearing 40 comprises a pressed sheet metal inner race 41, an outer race 42 also of pressed sheet metal, a row of rolling elements 43, here balls, and a cage 44 for maintaining a regular circumferential spacing between the rolling elements 43. The rolling elements 43 are disposed in a rolling chamber defined between raceways formed by toroidal portions of the inner race 41 and outer race 42.

As an alternative not shown, no rolling elements need to be used but rather the inner and outer races may directly contact each other, with a suitable low friction material, coating, or lubricant being used.

The rolling bearing 40 is integrally radially located between the inner hub 22 and the outer skirt 23 of the upper cup 20. The inner race 41 is fitted within a toroidal inner portion of the lower cup 30. The inner race 41 and the lower cup 30 form a lower annular bearing member. The outer race 42 is fitted onto a toroidal outer portion provided on the lower side of flange 21 of the upper cup 20. The outer race 42 and the upper cup 20 form an upper annular bearing member. The upper and lower annular bearing members are in relative rotation with respect to the axis X40.

The lower cup 30 comprises an axially-extending hub 31 defining an inner bore 33 wherein the rod 2 axially extends. The lower cup 30 further comprises a radial flange 32 that radially outwardly extends4 from the hub 31. The toroidal outer portion supporting the inner race 41 of the rolling bearing 40 is provided on an upper surface of the radial flange 32.

The lower cup 30 comprises a stiffening insert 34 extending along the hub 31 and the flange 32 so as to support the load and the shocks exerted by the spring 3 and to prevent any deformation of lower cup 30. Advantageously, the lower cup 30 is overmolded onto the stiffening insert 34.

Inner sealing element 50 are provided between an inner periphery of the radial flange 32 of the lower cup 30 and the inner hub 22 of the upper cup 20. Outer sealing element 60 are provided between an outer periphery of the radial flange 32 of the lower cup 30 and the outer skirt 23 of the upper cup 20.

The lower cup 30 is further provided with a damping element 70 made from a resilient material so as to enable vibrations to be filtered. The damping element 70 comprises a tubular axial portion 71 and a radial portion 72.

The radial portion 72 is tightly fastened to a lower surface of the radial flange 32 of the lower cup 30. The radial portion 72 comprises a lower radial side for receiving an end turn of the suspension spring 3 in bearing contact. The radial portion 72 of the damping element 70 supports axial load and shocks from the suspension spring 3.

The tubular axial portion 71 axially extends from the radial portion 72 towards the lower side of the suspension thrust bearing device 10. The tubular axial portion 71 is tightly fastened to an outer cylindrical surface of the hub 31 of the lower cup 30. The tubular axial portion 71 of the damping element 80 supports radial load and shocks from the suspension spring 2.

The tubular axial portion 71 and radial portion 72 of the damping element 70 are connected together so as to cover the exterior surface of the axial hub 31 and the radial flange 32 of the lower cup 30.

Advantageously, the damping element 70 is made from a resilient material, such as rubber thermoplastic elastomer (TPE), in particular thermoplastic polyurethane (TPU), melt processible elastomer (MPE) or elastomer cellular foam.

The damping element 70 is advantageously overmolded onto the lower cup 30.

According to the invention, the suspension thrust bearing device 10 comprises a lower radial indexation element 81 that radially outwardly protrudes from outer side of flange 32 of lower cup 30. Device 10 further comprises an upper radial indexation element 82 that radially outwardly protrudes from outer side of skirt 23 of upper cup 20. The radial indexation elements 81, 82 permit to define the assembly direction of the two associated annular members, and with respect to the vehicle chassis and the wheel.

Upper radial indexation element 82 is formed integral with the upper cup 20 and is made from the same material. Lower radial indexation element 81 is formed integral with the damping element 70. Lower radial indexation element 81 is then made of a resilient material that is different from material of lower cup 20. Lower radial indexation element 81 radially outwardly protrudes from outer side of radial portion 72 of damping element 70. Alternatively, lower radial indexation element 81 may be a separate part from damping element 70.

Thanks to the invention, indexation element 82 is deformable under shocks, notably during transportation. Box for suspension thrust bearing device 1 can be of simple design.

According to another aspect of the invention, the suspension thrust bearing device 10 comprises two axial indexation elements 91, 92 that axially downwardly protrude from lower side of hub 31 of lower cup 30. Axial indexation elements 91, 92 permit to ensure a correct assembly of a dust boot (not illustrated) onto the lower side of lower cup 30, and to form a rotation prevention portion.

Axial indexation elements 91, 92 are both formed integral with the damping element 70. Axial indexation elements 91, 92 are then made of a resilient material that is different from material of lower cup 20. Axial indexation elements 91, 92 axially downwardly protrude from lower side of axial portion 71 of damping element 70. Alternatively, axial indexation elements 91, 92 may be separate parts from damping element 70.

Figure 3:
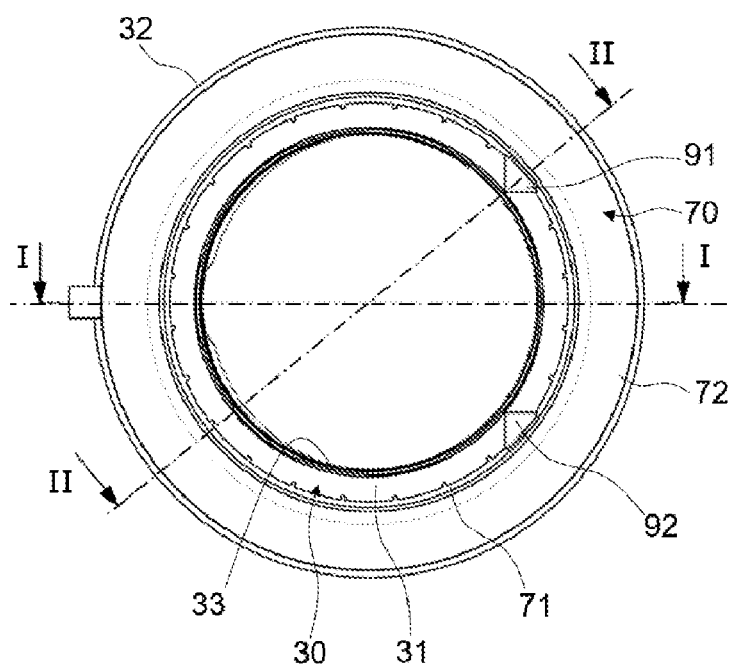
FIG. 3 is a perspective view of a lower cup body provided to the suspension strut of FIG. 1.

In the embodiment illustrated in FIG. 3, the lower cup 30 comprises a plurality of circumferentially equally-spaced slender grooves 35. Alternatively, the slender grooves are unevenly circumferentially spaced. Alternatively, the lower cup 30 comprises only one slender groove 35.

The damping element 80 comprises a plurality of portions 83 fitted within the slender grooves 35. The combination of portion 83 with grooves 35 form mechanical retention means for the damping element 80 with the lower cup 30. More precisely, the cooperation of portion 83 and grooves 35 prevents any relative rotation between the axial hub 81 of damping element and the axial hub 31 of lower cup 30.

Figure 4:
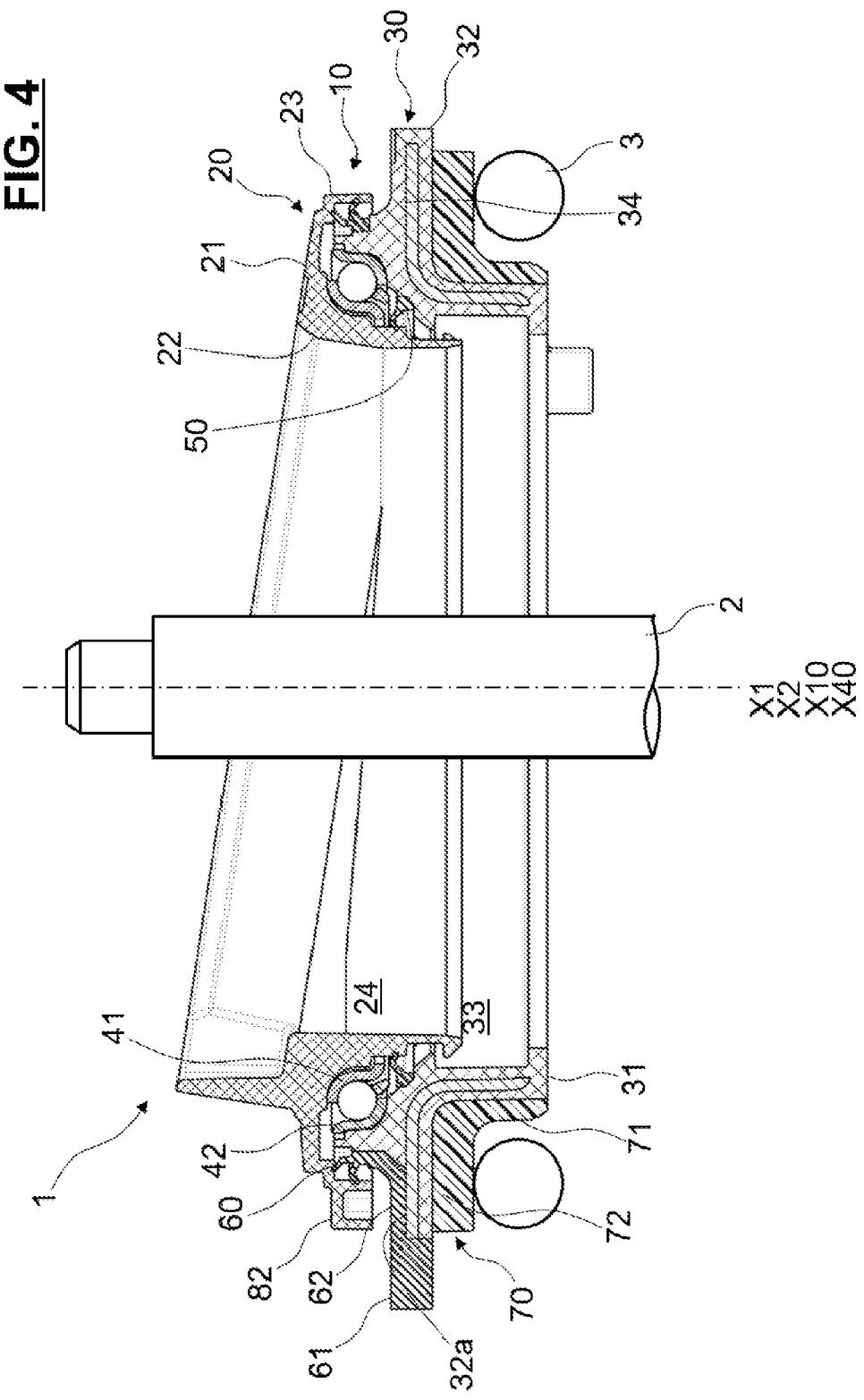
FIG. 4 is a sectional view of a suspension strut according to a second embodiment of the invention, comprising a suspension thrust bearing unit also according to a first embodiment of the invention, and a damper rod and a suspension spring.

A second embodiment of the invention is illustrated in FIG. 4, wherein the same elements bear the same references. The second embodiment only differs from the previous embodiment in that the device 10 is provided with a radial indexation element 61 formed integral with the outer sealing element 60.

The indexation element 61 radially outwardly protrudes from the radial flange 32 of lower cup 30. The indexation element 61 is connected to the outer sealing element 60 by a radial portion 62 extending through a radial groove 32a provided to the radial flange 32.

Advantageously, the outer sealing element 60 extended by the portion 62 and the indexation element 61 is overmouled onto the lower cup 30.

According to a non-illustrated embodiment, the inner sealing element 50 may also be connected to an axial indexation element that axially downwardly protrudes from axial hub 31 of lower cup 30.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved suspension thrust bearing device.

Moreover, various features of the above-described representative examples, as well as the various independent and dependent claims below, may be combined in ways that are not specifically and explicitly enumerated in order to provide additional useful embodiments of the present teachings.

The invention claimed is:

1. A suspension thrust bearing device for use with a suspension spring in an automotive suspension strut of a vehicle, the device comprising:
a bearing having upper and lower annular bearing members in relative rotation, the upper bearing member having an upper cup, the lower bearing member having a lower cup, the lower cup having a radial surface located axially farthest from the upper cup and being provided with at least one protruding indexation element protruding downwardly from the radial surface, and
a damping element made of resilient material and interposed between the lower cup and the suspension spring, wherein
the at least one protruding indexation element extends only along a portion of a circumference of the lower cup, wherein
the indexation element is made of a different material than that of the lower cup, and wherein
the lower cup being made of a rigid plastic material and the indexation element being made of a resilient material, the indexation element being deformable at a lower pressure than the lower cup.

2. The device according to claim 1, wherein the at least one indexation element is integrally formed with the damping element.

3. The device according to claim 1, wherein the lower cup is provided with an axial hub, and the damping element is provided with an axial portion fixed to an outer surface of the axial hub.

4. The device according to claim 2, wherein at least one indexation element axially downwardly protrudes from lower side of an axial portion of damping element.

5. The device according to claim 1, wherein the lower cup comprises an outwardly radially-extending flange, and the damping element is provided with a radial portion fixed to a lower surface of the flange.

6. The device according to claim 2, wherein at least one indexation element radially outwardly protrudes from outer side of a radial portion of damping element.

7. The device according to claim 1, wherein the indexation element comprises rubber thermoplastic elastomer, in particular thermoplastic polyurethane, melt processible elastomer or elastomer cellular foam.

8. The device according to claim 1, wherein the device comprises at least one sealing element attached to one of the lower and upper cups, and at least one indexation element is formed integral with a sealing element.

9. The device according to claim 1, wherein the lower cup is made of polyamide.

10. A motor vehicle suspension strut comprising a damper rod, a suspension spring, and a suspension thrust bearing device according to claim 1.

* * * * *